Patented Mar. 10, 1953

2,631,082

UNITED STATES PATENT OFFICE 2,631,082

LEAD SULFATE IMPRESSION MATERIALS

Stanley E. Noyes and Edwin H. Lochridge, Glendale, Calif., assignors to Dental Perfection Company, Glendale, Calif., a corporation of California No Drawing. Application March 28, 1952, Serial No. 279,228

11 Claims. (Cl. 18—47)

This invention relates to new compositions in elastic impression materials, and particularly dental impression materials, of the general type comprising a gel-forming agent and a metallic compound from which is made available in aqueous solution a metallic ion reactive with the gel-forming agent, either alone or with other metallic ions in the composition, to form the elastic gel component. Also commonly used in such materials are any of various retarders, the action and effect of which is by reason of their reactivity with the metallic compound or compounds, to delay formation of the gel over such period of time which will permit placement of the material against the subject to be molded or cast. Used as a dental impression material, arrival of the mixture at its gel point is delayed in the order of two to three minutes at mouth temperature. Such impression materials may also contain any of various fillers which are relatively or totally inert chemically, and serve essentially as physical body builders.

The invention is particularly concerned with new impression material compositions of this type employing compounds of lead, partially or entirely as the source of metallic ions reactive with the gel-forming component. As to the particular lead compound herein contemplated, our major object is to employ a lead salt complex which in the composition and aqueous solution formulated is sufficiently reactive with the gelling agent as to assure formation of a desirably shape-sustaining elastic gel within practicable time limits, and which also has such chemical stability within the composition in its dry packaged condition as will give to the material good shelf life over long periods of time. Heretofore it has been proposed to use certain lead compounds, for example lead oxide, which while having suitable reactivity with the gel-forming agent, adversely affect the desirable or necessary shelf life of the material.

In accordance with the invention we have found that proper gellation and extended shelf life may be achieved by impression material compositions containing a basic lead sulfate as a source of lead ions in the formation of the gel. As will appear, by reason of the chemical combination of the lead ions in the salt complex, the lead compound is found to possess the stability required for proper shelf life of the material.

Before proceeding to a more specific description and exemplification, it may be mentioned that the invention contemplates the use of any suitable gel-forming material in the general class consisting of the alginates (e. g. sodium, potassium, or ammonium alginate) the pectin derived gellable materials including the pectin salts and pectates, and the oxidized cellulosic gellable substances such as sodium, potassium, or ammonium carboxy methyl cellulose. For purposes of the present invention the alginates may be regarded as preferred, but in its broad aspects the invention contemplates the use of any of these gelling agents, or mixtures thereof, which are combinable with a metal ion, as in a base exchange type reaction, to form an elastic gel capable of accurately reproducing the subjects to be cast.

Commonly used retarders include the alkali metal carbonates, notably sodium carbonate, and the alkali metal phosphates and polyphosphates, e. g. trisodium phosphate and polyphosphate, sodium meta, ortho and pyrophosphates. Also usable as the retarder may be the metal salts of substituted acids of ethylene diamine dealt with in a copending application Serial No. 260,929 of Edwin H. Lochridge filed December 10, 1951. The invention contemplates that any of these retarders or mixtures thereof may be used in accordance with the requirements of any particular impression material.

These impression materials also include appropriate fillers such as powdered talc, clay, diatomaceous earth, calcium carbonate, silica and the like, all of which are relatively inert.

Basic lead sulphate as herein contemplated is a double compound of lead oxide and lead sulphate, which in its reactivity with the gel forming agent is believed to release lead ions from the oxide constituent to form e. g. lead aliginate, while the lead sulphate constituent appears to function as a stabilizer for the reactive lead oxide. Among the basic lead sulphates are monobasic lead sulphate ($PbO \cdot PbSO_4$), and tribasic lead sulphate ($3PbO \cdot PbSO_4 \cdot H_2O$). Either or both may be used in themselves, or with other metallic compounds such as calcium, zinc or strontium salts.

The following are given as typical examples of impression materials whose compositions render them suitable as dental impression materials.

*Example 1*

5.5 grams diatomaceous earth
1.2 grams sodium alginate (low visc.)
.5 gram sodium alginate (high visc.)
.10 gram tetrasodium pyrophosphate
.50 gram $Na_2SiF_6$
5.0 grams monobasic lead sulphate (Eagle Picher Co.) mixed with 25 cc. H₂O at 70° F., congealed 2 min., set 5 min.

*Example 2*

5.5 grams diatomaceous earth
1.2 grams sodium alginate (med. visc.)
.5 gram sodium alginate (high visc.)
.1 gram tetrasodium pyrophosphate
.1 gram Na₂SiF₆
5.0 grams blue monobasic lead sulphate mixed with 25 cc. H₂O at 70° F., congealed 45 sec., set in 1½ min.

*Example 3*

5.5 grams diatomaceous earth
2.2 grams sodium alginate (med. visc.)
.2 gram disodium phosphate
.150 gram Na₂SiF₆
3.0 grams tribasic lead sulphate (National Lead Co.) mixed with 25 cc. H₂O at 70° F., congealed 2½ min., set 3½ min.

*Example 4*

4.0 grams diatomaceous earth
2.0 grams carboxy methyl cellulose (med. visc.)
.10 gram disodium phosphate
.10 gram K₂SiF₆
3.0 grams tribasic lead sulphate mixed with 25 cc. H₂O at 70° F., congealed 1½ min., set 4 min.

*Example 5*

4.0 grams diatomaceous earth
2.0 grams carboxy methyl cellulose (med. visc.)
.05 gram tetrasodium pyrophosphate
.250 gram Na₂SiF₆
5.0 grams monobasic lead sulphate (Eagle Picher Co.) mixed with 25 cc. H₂O at 70° F., congealed 1½ min., set 4 min.

*Example 6*

4.0 grams diatomaceous earth
2.0 grams carboxy methyl cellulose (med. visc.)
.05 gram tetrasodium pyrophosphate
.250 gram K₂SiF₆
10.0 grams monobasic lead sulphate (Eagle Picher Co.) mixed with 25 cc. H₂O at 70° F., congealed 1¼ min., set 4 min.

*Example 7*

5.0 grams diatomaceous earth
4.0 grams Pectophil (low methoxy pectin)
.10 gram Na₂SiF₆
.175 gram disodium phosphate
3.0 grams tribasic lead sulphate mixed with 25 cc. H₂O at 70° F., congealed 45 seconds, set 2 min.

*Example 8*

5.0 grams diatomaceous earth
4.0 grams Pectophil (low methoxy pectin)
.350 gram tetrasodium pyrophosphate
.10 gram Na₂SiF₆
10.0 grams monobasic lead sulphate (Eagle Picher Co.) mixed with 25 cc. H₂O at 70° F., congealed 2 min., set 6 min.

*Example 9*

5.5 grams diatomaceous earth
2.2 grams sodium alginate
.30 gram disodium phosphate
.15 gram Na₂SiF₆
.25 gram Hydrocal (CaSO₄·½H₂O)
3.0 grams tribasic lead sulphate

*Example 10*

5.5 grams diatomaceous earth
2.2 grams sodium alginate
.2 gram tetrasodium pyrophosphate
.3 gram Na₂SiF₆
.25 gram Hydrocal
.5 gram monobasic lead sulphate

We claim:

1. An impression composition capable of forming in aqueous solution an elastic gel, comprising a gel-forming agent of the group consisting of a water-soluble alginate, gellable pectin material and carboxy methyl cellulose, and a lead basic sulphate reactive therewith.

2. An impression composition capable of forming in aqueous solution an elastic gel, comprising a gel-forming agent of the group consisting of a water-soluble alginate, gellable pectin material and carboxy methyl cellulose, and lead monobasic sulphate reactive therewith.

3. An impression composition capable of forming in aqueous solution an elastic gel, comprising a gel-forming agent of the group consisting of a water-soluble alginate, gellable pectin material and carboxy methyl cellulose, and lead tribasic sulphate reactive therewith.

4. An impression composition capable of forming in aqueous solution an elastic gel, comprising a gel-forming agent of the group consisting of a water-soluble alginate, gellable pectin material and carboxy methyl cellulose, a fluosilicate, and a lead basic sulphate reactive with said gel-forming agent.

5. A composition as defined in claim 4, in which the lead sulphate is lead monobasic sulphate.

6. A composition as defined in claim 4, in which the lead sulphate is lead tribasic sulphate.

7. An impression composition capable of forming in aqueous solution an elastic gel, comprising a gel-forming agent of the group consisting of a water soluble alginate, gellable pectin material and carboxy methyl cellulose, a filler, a retarder and a metallic component of the group consisting of lead monobasic sulphate and lead tribasic sulphate.

8. An impression material as defined in claim 7, containing also a fluosilicate.

9. An impression composition capable of forming in aqueous solution an elastic gel, comprising a water soluble alginate, a retarder and a basic lead sulphate.

10. An impression composition capable of forming in aqueous solution an elastic gel, comprising a gellable pectin material, and a basic lead sulphate.

11. An impression composition capable of forming in aqueous solution an elastic gel, comprising carboxy methyl cellulose and a basic lead sulphate.

STANLEY E. NOYES.
EDWIN H. LOCHRIDGE.

REFERENCES CITED

The following references are of record in the file of this patent:

UNITED STATES PATENTS

| Number | Name | Date |
|---|---|---|
| 2,422,497 | Noyes | June 17, 1947 |
| 2,568,752 | Lochridge | Sept. 25, 1951 |